United States Patent [19]

Westlund

[11] 4,372,396

[45] Feb. 8, 1983

[54] METHOD AND SYSTEM FOR CONTINUOUS TURN-OVER OF SOIL

[75] Inventor: Erik A. Westlund, Aby, Sweden

[73] Assignee: Wolter Konstruktion Erik Axel Westlund, Sweden

[21] Appl. No.: 259,091

[22] Filed: Apr. 30, 1981

Related U.S. Application Data

[63] Continuation of Ser. No. 46,091, Jun. 6, 1979, abandoned.

[30] Foreign Application Priority Data

May 2, 1979 [SE] Sweden ................... 7900969

[51] Int. Cl.³ ................... A01B 9/00; A01B 79/00
[52] U.S. Cl. ................... 172/1; 172/33
[58] Field of Search ................... 172/1, 33, 39, 63, 66, 172/67, 123, 117, 265

[56] References Cited

U.S. PATENT DOCUMENTS

| 1,408,615 | 3/1922 | Lofton ................... 172/117 X |
| 2,098,552 | 11/1937 | Peterson ................... 172/33 |
| 3,202,221 | 8/1965 | Monk et al. ................... 172/63 |
| 3,527,307 | 9/1970 | Bushmeyer ................... 172/265 |

FOREIGN PATENT DOCUMENTS

| 2359468 | 6/1975 | Fed. Rep. of Germany . |
| 2538989 | 3/1976 | Fed. Rep. of Germany ...... 172/123 |
| 909795 | 1/1946 | France ................... 172/33 |
| 207695 | 9/1966 | Sweden . |
| 221382 | 7/1968 | Sweden . |
| 578916 | 11/1977 | U.S.S.R. ................... 172/33 |

*Primary Examiner*—Paul E. Shapiro
*Attorney, Agent, or Firm*—Brumbaugh, Graves, Donohue & Raymond

[57] ABSTRACT

The method and apparatus for continuous turn-over of soil in accordance with the invention are characterized in that the turn-over of soil takes place in a system including a rotor, the direction of rotation of which is opposite to the wheels of a vehicle drawing the rotor, and symmetrically-shaped plough units cooperating with the rotor in such a way that the pikes of the bows of the rotating rotor engage the soil, which has been lifted by the plough unit, from beneath and from behind, as seen in the direction of movement of the apparatus. The flow of soil thus lifted up is divided up into transverse pieces, which are turned and deposited behind the apparatus. During this process the rotary movement of the rotor is independent of the control of the displacement movement of the apparatus. Also, the compactness of the soil material may be levelled out to the required degree through preparatory working. Reference FIG. 1.

8 Claims, 9 Drawing Figures

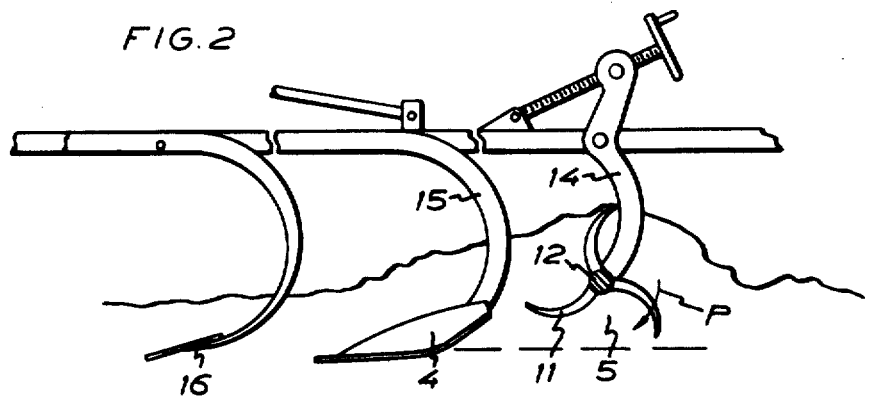
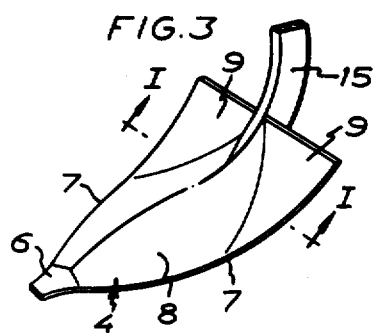
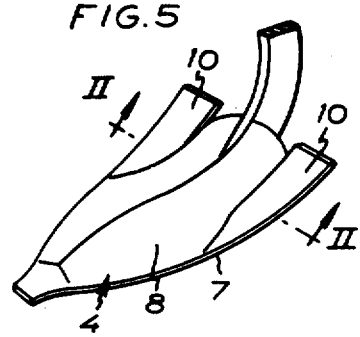
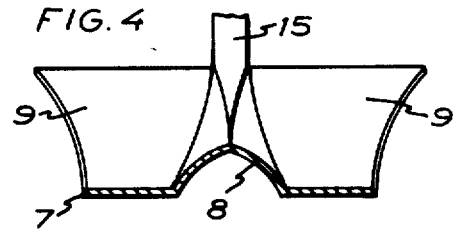
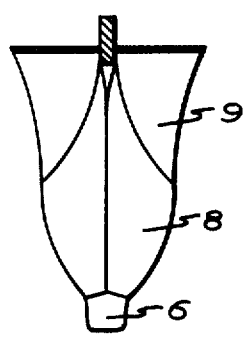
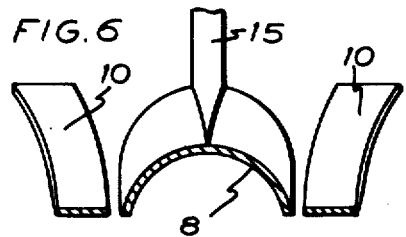

METHOD AND SYSTEM FOR CONTINUOUS TURN-OVER OF SOIL

This is a continuation of application Ser. No. 046,091, filed June 6, 1979, now abandoned.

BACKGROUND OF THE INVENTION

The present invention relates to a method of continuously turning over soil for agricultural purposes and an implement therefor.

As the method implies that the turn-over of soil is carried out by means of a rotor, which may be considered a critical point, the distinction should be made that the rotor, although it is important, should not be regarded as the central or prevalent part of the implement. The rotor, which in accordance with this invention is regarded as a more secondary part, is part of a system which can be completed with other means in view of the rather low capacity of the rotor. This system will be described below.

Another distinction is this regard concerns the direction of rotation of the rotor, since this may involve a definite obstacle. The rotor must assume a direction of rotation opposite to that of the wheels of a vehicle driving the rotor but also on this point the system indicated above provides further possibilities. The rotor will be relieved to the required extent by means of prongs working up the soil and by plough means raising the soil to a proper level of attack for the rotor movement without causing any unnecessary soil resistance. The problem concerning rotation can be solved by means of the control technique which is now available.

That no solution of the problem has been found over such long a period of time depends on the fact that it has not until now become possible mechanically to handle the last link in a chain of experiments, although the line of development has been right, characterized by passing from a stationary, not further variable body into a system.

It has thus become possible to carry out a rotor-operated turn-over of the soil and introduce increased working facilities instead of applying a pattern with a laterally turning disc.

SUMMARY OF THE INVENTION

The device of the invention for working the soil for agricultural purposes comprises a frame which is carried by wheels or like means and is adjustable to suitable height positions, essentially stationary means carried by said frame and adapted to work the soil during displacement of the frame, and mobile means carried by the frame and likewise working the soil during displacement of the frame; wherein each of said stationary means includes cutting and guiding means consisting of a pointed front part, a rearwardly divergent part extending from said front part and situated in essentially the same horizontal plane as said front part, the edges of said divergent part constituting cutting edges and upwardly curved guide surfaces arranged at the rear portion of said divergent part; wherein the mobile means include a number of rotor units, with curved vanes or arms, adapted for rotation on a shaft situated behind the stationary means and transversely of the direction of motion, one rotor unit being arranged behind each of said guide surfaces; wherein the rotor units are rotatable in a direction which is opposite to the rolling direction of the wheels or like means and adjusted in relation to the propulsion speed of the working device in such a way that the circumferentially extending end portions of the vanes or arms of the rotor units describe cycloidal paths having their lowest point on a level with the cutting edges of the stationary means and thus engage material carried obliquely upwardly by means of said guide surfaces of the cutting and guide means, and catch and deposit this material behind the rotor units after it has been turned over.

The method of the invention for working soil for agricultural purposes, comprises the steps of making generally vertical furrows in the soil by a number of principally stationary means arranged in side-by-side relationship, making generally horizontal furrows by further means, provided with cutting edges, on a level generally corresponding to the bottom of the said vertical furrows in the soil between the latter, carrying and lifting the soil that has been substantially detached from the sides of the vertical furrows and detached vertically from the horizontal furrows by means of upwardly curved guide surfaces associated with the means provided with cutting edges, while utilizing the movement of the device relative to the soil, and lifting, turning over and depositing the soil behind the rotor units with the aid of rotor means aligned with said guide surfaces and rotatable about a transverse shaft located behind said surfaces, as counted in the direction of movement, and provided with curved, thin vanes or arms, while the peripheries of said vanes describe cycloidal paths.

BRIEF DESCRIPTION OF THE DRAWINGS

The invention will be described in greater detail hereinafter by way of example, reference being had to the accompanying drawings, in which:

FIG. 2 is a side view of the implement;

FIG. 3 is a perspective view of a plough means;

FIG. 4 shows a section on line I—I in FIG. 3;

FIG. 5 is a perspective view of a plough means of an alternative design;

FIG. 6 shows a section on line II—II in FIG. 5;

FIG. 7 is a top plan view of a plough means;

DESCRIPTION OF AN ILLUSTRATIVE EMBODIMENT

Figure 1:
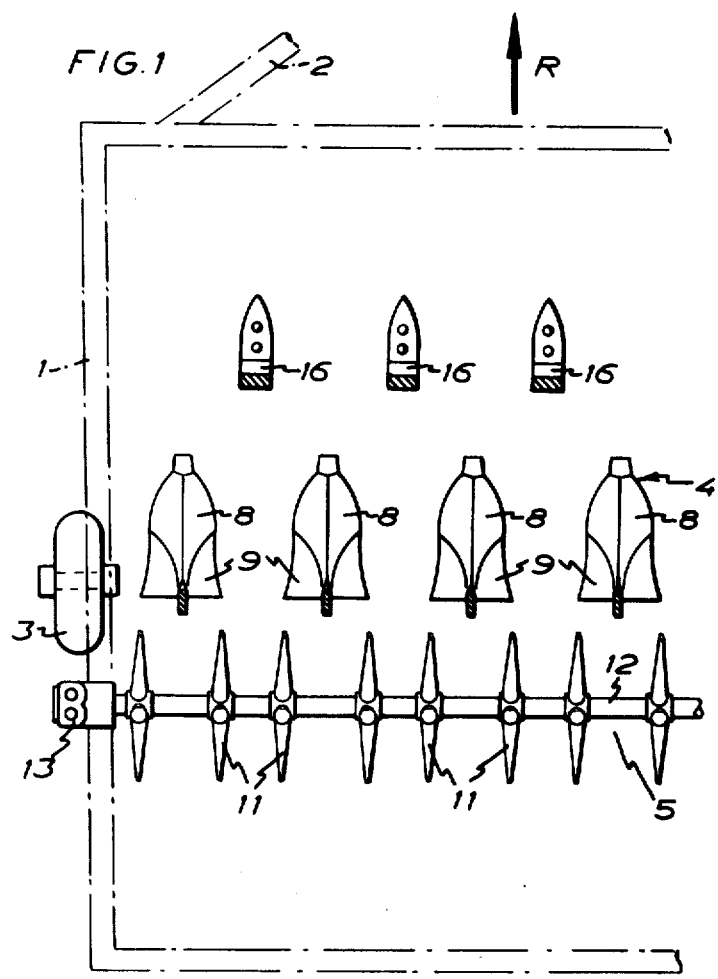
FIG. 1 is a top plan view of part of the implement, provided with prongs working up the soil from the front, as counted in the driving direction, plough means and a soil-turning rotor according to the invention.

Referring now to the drawings, 1 designates a frame for the implement, provided with a draw-bar 2, indicated by broken lines, and carrying wheels 3 which normally are equipped with hydraulic means for raising or lowering the partly shown frame which, accordingly, can carry the working means to the appropriate depth. Regarding suspension, specific adjustment and securing of the soil-engaged means against breakage, no details are indicated in addition to the examples of FIG. 2, because this can be carried out by several equivalent means.

The plough means 4 are mounted on the frame 2. They are equilaterally formed with a plough share 6 and a lower cutting edge 7. Extending symmetrically from either side of the central, upwardly directed, convex body 8 are upwardly bent and outwardly directed surfaces 9 which alternatively may be replaced by bars 10 secured in a similar manner to the plough body and having the same purpose, i.e. raising the soil to an equal and uniform level in front of the rotor 5.

In the embodiment shown the rotor 5 comprises a number of wheels provided each with three bows or bow-shaped vanes 11 and mounted on a shaft 12 which is rotated, together with the bows 11, by a power source, which is not bound to the drive for the propulsion of the implement, normally consisting of a hydraulic motor, indicated at 13 in FIG. 1. As appears from the direction of rotation P the rotor bows are rotated in a direction opposite to the rolling direction of the carrying wheels 3, and the bows 11, which consist of bent, pitchforklike arms terminating in a point, are swung forwardly in the direction of rotation P. The line 21 in FIG. 8 indicates a rolling plane for the rotor.

The plough means 4 are carried in the frame 1 by beams 15 and are laterally adjustable relative to each other but also to the pikes of the rotor bows 11 in such manner that they can be inclined in forward direction for finding different ways in the soil. The rotor 5 is carried by beams 14 which are articulated to permit proper adjustment with respect to the plough means 4, as indicated in principle in FIG. 2. Preparatory working by means of prongs 16, the number and the lateral spacing of which may vary as a function of the ground conditions, takes place in the manner normally practised in connection with deep loosening of soil according to FIGS. 1 and 2. In addition to the requirement that the prong 16 must be capable of levelling out the compactness of the soil no specific demands are made upon the design of said prong 16.

Figure 8:
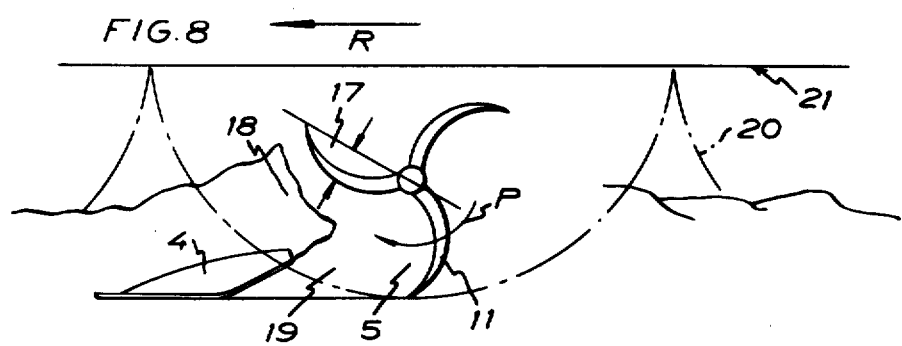
FIG. 8 illustrates schematically the function of the rotor according to FIGS. 1 and 2, consisting of a number of pointed bows.
Figure 9:
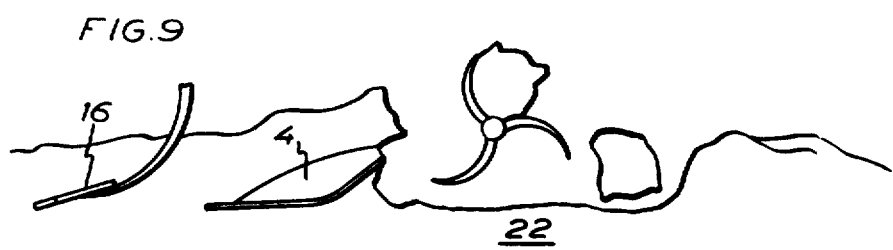
FIG. 9 shows schematically the movement pattern of the soil during the travel of the plough means and the rotor through the soil.

The cooperation between the plough means and the following rotor will be described in greater detail with reference to FIG. 8. The implement is moved in the direction of the arrow R and brings the rotor 5 to rotate in the direction of the arrow P as already mentioned. The plough means 4 will thus make a horizontal cut in the soil, which has been worked up in advance to the required degree, and by means of their upwardly curved surfaces 9, alternatively 10, said plough means will lift the soil a little distance, depending on the setting of the plough means 4, as indicated at 18. A soil-free zone 19 will thus be situated beneath and immediately behind the plough means. The pikes of the rotor bows 11 will thus move through a zone 19 which is substantially empty of soil, and engage from underneath the soil running over the plough means and leaving the surfaces 9 or, alternatively, the bars 10. Owing to the fact that during the rotation of the rotor the implement moves in forward direction, the pikes 11 of the rotor will describe a cycloidal path 20 which extends the turning movement and permits turning and depositing of the soil. Thus, a great advance was made with this invention when establishing that it was possible to obtain uniform flow with turning of the soil. The curvature 17 of the rotor bows 11 and the relation between rotation and straight driving 20 agree with the cycloidal calculation in FIG. 8. The propulsion of the implement is normally effected by means of a tractor or a motor placed on the implement. FIG. 9 elucidates the turning operation as a function of the cycloidal extension 22, and swelling of soil normally contributes to compressing the soil as shown in this figure.

As appears from the foregoing description of this invention, working and turning of the soil is obtained by means of an implement which is quite open and not liable to be clogged by stone, roots, straw, etc. In this connection the variation in soil material should also be taken into account. Under such circumstances the soil-engaging means of the implement cannot be fixed in a stationary position. The spacing of the means 4, 5 and 16 is adjustable in order to obtain reliability in operation and efficiency in working of various soils. The module of lateral spacing, indicated in FIG. 1, is not imperative but may call for adjustment. This also applies to, for example, the intervals between the rotor bows 11 on the shaft 12, or the degree of displacement of the surfaces 9 or, alternatively, 10 along the plough means 4 towards the ploughshare 6 or the constructional details of said means.

Characteristic of the invention is that a turning surfaces, regarded as a solid body, changes and divides to relieve and complete a rotor, which makes use of the direction of rotation according to the invention and brings about the free operation strived for. The tool acts as a member of the aforementioned system.

Two features, although less visible, contribute to this. On one hand, the system includes a control, localized to the rotor movement, which is carried out by a hydraulic control means capable of providing the freedom required to produce even throughflow in the implement and, on the other hand, the system is characterized by an equally decisive feature, which concerns the soil resistance and is generally localized to the soil-raising plough means 4. This requirement is met by said means 4 which essentially are narrow and are placed at great lateral intervals. Also the reliability in operation requires this open form where the soil is allowed to flush the soil-engaging construction and, as far as the plough means 4 are concerned, it is of decisive importance that the soil material should not be contradictory to these conditions.

The inventive idea resides in introducing a system of freely operating units 4, 5 and 16, which cooperate intimately with one another, including a rotor 5 the direction of rotation of which is opposite to the direction of rolling of the wheels 3, and including preparatory working of the soil at 16 and lifting the soil in front of the rotor 5 by soil-raising plough means 4, which thus allow the direction of rotation and relieve the rotor under influence of a control which is independent of the propulsion. To this should be added another moment permitting the invention to find a proper expression. In the foregoing the construction of the implement is described, it is stated that the rotor is relieved in a certain manner and how the soil is carried up to a turn-over movement but so far the decisive point, which involves the solution of the rotor problem, has not been fully described. Here the invention has attained the point where the rotor is put to its real trial and solved the problem which constructionally amounts to reducing the risk zone of the rotor to a short impulse whereby its hypersensitivity is overcome. This impulse can only be obtained within a previously started movement which can be completed with a small addition. These requirements are satisfied by the indicated direction of rotation and the specifically controlled, even flow. The nature of the invention is apparent from what has thus been achieved. The invention states how said impulse is governed. Its novelty appears therefrom. As a further distinction it is pointed out that the rotor must exert a pressure or run somewhat faster than in case of merely rolling. The displacement between rectilinear and circular motion can only be judged through a series of full-scale tests. The development work has now reached its final aim by producing an even flow of turned-over soil.

The disadvantages associated with a constrained working pattern using ordinary ploughs with turning disc is eliminated and avoided with the present invention.

What I claim and desire to secure by Letters Patent is:

1. Device for working the soil for agricultural purposes, comprising:

a frame which is displaceably carried by wheels and is adjustable to suitable height positions;

a plurality of prong means supported on said frame at forward, laterally-spaced positions for making vertical cuts in soil, each prong means being adapted to extend downwardly from the frame into the soil and being forwardly curved;

a plurality of plough means, carried by said frame at respective positions laterally spaced between and behind said prong means in the direction of displacement of the device, for making horizontal cuts in the soil and lifting it during displacement of the frame, each of said plough means includes a pointed front part and a rearwardly divergent part entending from said front part and situated in essentially the same horizontal plane as said front part, the divergent part being adapted for making horizontal cuts in the soil at the same depth as the vertical cuts made by the prong means, each plough means also includes upwardly curved guide surfaces arranged at the rear portion of said divergent part for lifting the cut soil to form a continuous soil strip; and a plurality of rotor means, each in the form of a number of planar radially extending curved vanes, said rotor means being rotatably supported on a shaft situated behind the plough means for engaging the lifted soil strip from below and essentially perpendicular to the soil strip so as to cut the soil strip transversely into segments substantially without mixing it, said rotor means further turning the segments over and depositing the segments behind the rotor means, one rotor means is arranged behind each of said guide surfaces, said rotor means form rows of aligned vanes forwardly curved in the direction of rotation and rotatable in a direction which is opposite to the rolling direction of the wheels, said rotation is at a rotational speed adjustable relative to the displacement speed of the device in such a way that the end portions of the vanes describe cycloidal paths having their lowest point on a level with the lowest portions of the divergent parts.

2. Device as claimed in claim 1, wherein the plough means are joined at their back with the frame via a support, which support includes a ridge-shaped portion extending rearwardly from the pointed front part.

3. Device as claimed in claim 2, wherein the guide surfaces comprise two vane-shaped upwardly curved surfaces which are arranged at the back of the ridge-shaped portion of the support, the extension of which support is adjustable laterally as well as longitudinally.

4. Device as claimed in claim 2, wherein the guide surfaces comprise upwardly curved, band-shaped portions extending from the ridge-shaped portion.

5. Device as claimed in claims 1, wherein the distance between the plough means and the rotor means is adjustable in the direction of frame displacement.

6. Device as claimed in claim 1, wherein the rotor means are driven at a peripheral speed exceeding the displacement speed of the device.

7. Device as claimed in claim 1, wherein the rotor means are driven by hydraulic motor means for driving the rotor means at variable speeds independent of the rate of displacement of the device.

8. A method of working soil for agricultural purposes, comprising the steps of:

making generally vertical furrows in the soil with a number of prong means arranged in side-by-side relationship on a displaceable frame;

making generally horizontal furrows by plough means provided with cutting edges, said horizontal furrows being on a level generally corresponding to the bottom of the vertical furrows and being located in the soil between the vertical furrows;

carrying and lifting the soil that has been substantially detached from the sides of the vertical furrows and detached vertically from the horizontal furrows by means of upwardly curved guide surfaces associated with the plough means, so as to form a raised continuous strip of said soil; and lifting and transversely cutting the continuous strip of soil into segments, and turning over and depositing the soil segments back on the ground, all with the aid of a plurality of rotor means each aligned with one of said guide surfaces and rotatable about a transverse shaft located behind said surfaces, each of said rotor means being provided with curved, thin vanes whose peripheries describe cycloidal paths.

* * * * *